R. J. MARTIN.
HAND RAKE ATTACHMENT.
APPLICATION FILED MAR. 26, 1917.

1,276,671.

Patented Aug. 20, 1918.

INVENTOR
Roy J. Martin

WITNESSES

BY

ATTORNEY

UNITED STATES PATENT OFFICE.

ROY J. MARTIN, OF LAMAR, OKLAHOMA.

HAND-RAKE ATTACHMENT.

1,276,671. Specification of Letters Patent. Patented Aug. 20, 1918.

Application filed March 26, 1917. Serial No. 157,535.

*To all whom it may concern:*

Be it known that I, ROY J. MARTIN, a citizen of the United States, residing at Lamar, in the county of Hughes and State of Oklahoma, have invented certain new and useful Improvements in Hand-Rake Attachments, of which the following is a specification.

This invention relates to hand rakes, and has for its object to provide a cleaning attachment for the teeth thereof for the removal of trash that gathers about the teeth of a rake when the latter is drawn over a lawn or surface of the ground, said attachment extending through the head of the rake, and is provided with a pressure plate on its end, which upon reversing the rake and pressing downwardly upon the ground causes the attachment to remove all trash from the rake teeth.

Another object of the invention is to provide a hand rake with a cleaning attachment comprising a plate having perforations for the teeth which lies normally against the head of the rake and is movable toward the points of the teeth for cleaning trash therefrom, said plate having a sliding member extending through the head of the rake and terminating in a plate which serves when pressure is applied thereto to move the plate toward the points of the teeth for cleaning them and which plate may also be employed as a hoe for tilling soft earth.

With the above as the principal objects in view the invention consists in the novel construction, combination, and arrangement of parts hereinafter described, pointed out in the claims, and illustrated in the accompanying drawings, in which—

Figure 1:
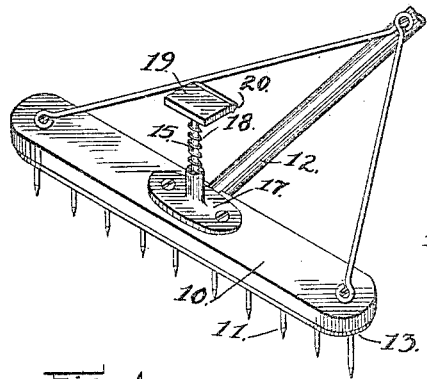
Figure 2:
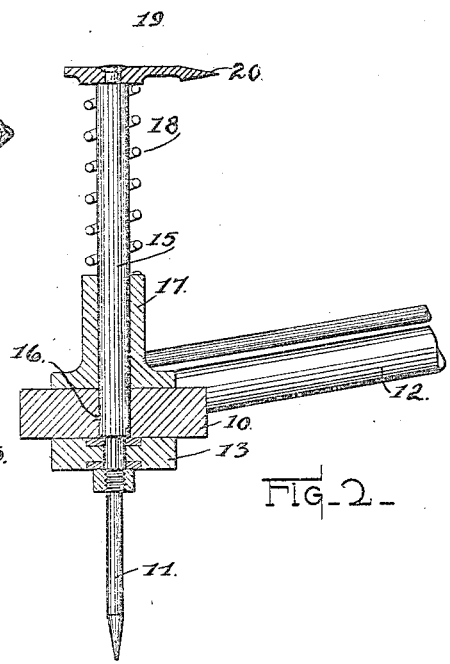
Figure 3:
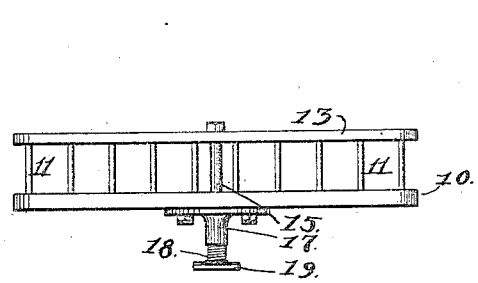
Figure 4:
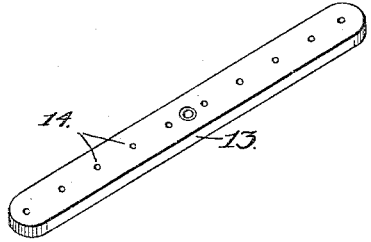

Figure 1 is a perspective view of an ordinary hand rake with the improved cleaning attachment in position thereon, Fig. 2 is a cross sectional view through the head of a rake with the cleaning attachment in its inoperative position, Fig. 3 is a view of the head of the rake in elevation and in inverted position to show the action of the attachment for removing trash from the teeth of the rake, and Fig. 4 is a perspective view of a detail of the invention.

In the drawing, 10 indicates the head of an ordinary hand or garden rake from one side of which depend a number of teeth 11 and which has a handle 12 for manipulating the rake, as is common and well known in the art. 13 is a plate substantially as long as the head 10 of the rake and has a plurality of spaced holes 14 formed therein equal in number to the number of teeth in the rake head. Through these openings the teeth 11 are adapted to pass freely so that the plate 13 may be moved easily from the base of the teeth to the points thereof when it is desired to clean them from trash that has been collected by the use of the rake. The plate 13 is normally held in contact with the under side of the head 10 as shown in the drawings by securing to the center of said plate a rod 15 projecting upwardly through an opening 16 in the head and through a guide sleeve 17 fastened on the top of the head. A coil spring 18 surrounding the rod 15 bears at one end on the top of the sleeve 17 and at its outer end against a plate 19 riveted to the upper end of the rod 15. By this arrangement the spring 18 holds the plate 13 closely against the under side of the rake head 10 and the latter offers no impediment to the proper use of the rake.

The plate 19 here shown of rectangular form has one edge 20 straight and sharpened to form a cutting edge that will enable the plate to be used under certain conditions as a hoe to dig into soft earth around plants.

In using the rake, after the teeth have become clogged by a collection of trash, it is only necessary to reverse it, as in Fig. 3, and placing the plate 19 against the ground press downwardly on the plate. This action will compress the spring 18 and force the plate 13 toward the points of the teeth, effectually cleaning therefrom all the collected trash which by a slight shake will fall from the rake to the ground. Upon the removal of trash the spring 18 will restore the parts to their normal position shown in Fig. 2. The plate 19 is made sufficiently large to prevent the latter sinking into the soft earth when pressure is applied for the purpose of compressing the spring and cleaning the teeth. This plate serves the double purpose of a hoe and also as a head for the rod 15 when pressure is to be applied for cleaning the teeth.

What I claim is:

1. A cleaning attachment for a hand rake comprising a cleaning plate having a series of spaced perforations for the rake teeth, said plate adapted to be maintained in contact with the head of the rake but movable toward the points of the teeth, a stem secured to said plate and passing upwardly through the rake head, an elongated socket attached to the rake head to form a guide and bearing for said stem, a rectangular plate fixed on the upper end of said stem and forming a head therefor, said plate being substantially parallel with the rake head and having a sharpened inner edge whereby the plate is adapted to serve as a hoe when the rake is reversed and when pressed upon serving to move said cleaning plate lengthwise of the rake teeth and remove all trash therefrom, and a spring between the hoe plate and the rake head for maintaining the cleaning plate normally in contact with the rake head.

2. In a hand rake, a cleaning attachment therefor comprising a cleaning plate movable lengthwise of the rake teeth, a stem connected to said cleaning plate and passing through the rake head, a head secured to the upper end of said stem and having a straight sharpened edge, said head serving the double purpose of a hoe when the rake is reversed and to operate the cleaning plate when pressure is applied thereto, and a spring surrounding said stem between the head of the rake and the head forming the hoe.

In testimony whereof I affix my signature in presence of two witnesses.

ROY J. MARTIN.

Witnesses:
E. F. PIERCE,
A. A. HUNNECUTT.

Copies of this patent may be obtained for five cents each, by addressing the "Commissioner of Patents, Washington, D. C."